US012728712B2

(12) United States Patent
Li et al.

(10) Patent No.: US 12,728,712 B2
(45) Date of Patent: Sep. 8, 2026

(54) HIDDEN BELT WEATHERSTRIP ASSEMBLY

(71) Applicants: Zhejiang ZEEKR Intelligent Technology Co., Ltd., Ningbo (CN); Zhejiang Geely Holding Group Co., Ltd., Hangzhou (CN)

(72) Inventors: Yang Li, Ningbo (CN); Yanan Xu, Ningbo (CN); Liang Ji, Ningbo (CN); Xianghui Lin, Ningbo (CN)

(73) Assignees: Zhejiang ZEEKR Intelligent Technology Co., Ltd., Ningbo (CN); Zhejiang Geely Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 18/948,822

(22) Filed: Nov. 15, 2024

(65) Prior Publication Data

US 2025/0065703 A1 Feb. 27, 2025

Related U.S. Application Data

(63) Continuation of application No. PCT/CN2023/094696, filed on May 17, 2023.

(30) Foreign Application Priority Data

May 17, 2022 (CN) ......................... 202221192073.1

(51) Int. Cl.
*B60J 10/76* (2016.01)
*B60J 10/86* (2016.01)

(52) U.S. Cl.
CPC ............... *B60J 10/76* (2016.02); *B60J 10/86* (2016.02)

(58) Field of Classification Search
CPC . B60J 10/265; B60J 10/76; B60J 10/36; B60J 10/30; B60J 10/75; B60J 10/86
See application file for complete search history.

(56) References Cited

U.S. PATENT DOCUMENTS 5,275,455 A 1/1994 Harney et al.
8,572,897 B2 * 11/2013 Dishman ................. B60J 10/86 49/377

(Continued)

FOREIGN PATENT DOCUMENTS

CN 207617480 U * 7/2018
CN 208530251 U * 2/2019

(Continued)

OTHER PUBLICATIONS

CN207617480U English translation from WIPO (Year: 2017).*

(Continued)

*Primary Examiner* — Muhammad Ijaz
*Assistant Examiner* — Susan M. Heschel
(74) *Attorney, Agent, or Firm* — Bayes PLLC

(57) ABSTRACT

A hidden belt weatherstrip assembly is provided on a vehicle door sheet metal with a first positioning member. The hidden belt weatherstrip assembly includes an outer belt weatherstrip. A first injection-molded joint corner is provided on an end side of the outer belt weatherstrip. A first positioning portion is provided on the first injection-molded joint corner. The first positioning member is fitted to the first positioning portion. The first injection-molded joint corner is fixed to the vehicle door sheet metal.

20 Claims, 5 Drawing Sheets

(56) References Cited

U.S. PATENT DOCUMENTS

| | | | | |
|---|---|---|---|---|
| 9,038,318 | B2 * | 5/2015 | Jendrossek | B60J 10/2335 49/492.1 |
| 10,150,405 | B2 * | 12/2018 | Hundt | B60Q 1/2661 |
| 10,889,171 | B2 * | 1/2021 | Thiele | B60J 10/32 |
| 2009/0151266 | A1 * | 6/2009 | Shumulinskiy | B60J 10/16 49/492.1 |

FOREIGN PATENT DOCUMENTS

| | | | |
|---|---|---|---|
| CN | 208558993 | U | 3/2019 |
| CN | 110370904 | A | 10/2019 |
| CN | 216374137 | U | 4/2022 |
| CN | 217863668 | U | 11/2022 |
| DE | 102011121416 | A1 | 6/2013 |
| JP | H068805 | U | 2/1994 |
| JP | 2015208999 | A | 11/2015 |
| KR | 100588692 | B1 | 6/2006 |

OTHER PUBLICATIONS

CN208530251U English translation from WIPO (Year: 2018).*

International Search Report and Written Opinion issued in related International Application No. PCT/CN2023/094696 dated Aug. 8, 2023 (14 pages).

Extended European Search Report in related European Application No. 23806966.0 dated Mar. 17, 2026 (8 pages).

* cited by examiner

HIDDEN BELT WEATHERSTRIP ASSEMBLY

CROSS-REFERENCE TO RELATED APPLICATIONS

This application is a continuation of International Application No. PCT/CN2023/094696, filed on May 17, 2023, which claims the benefit of priority to Chinese Application No. 202221192073.1, filed on May 17, 2022, both of which are hereby incorporated by reference in its entireties.

TECHNICAL FIELD

The present disclosure relates to the technical field of vehicles and, in particular, to a hidden belt weatherstrip assembly.

BACKGROUND

A vehicle door outer belt weatherstrip is a kind of sealing strips, which is assembled between a vehicle door glass and a vehicle door outer plate to achieve the effects of decorating and sealing a vehicle door window as well as guiding the running of the vehicle door glass simultaneously, and which is an indispensable part in automobile assembling. In order to improve the appearance quality of the trimming, a hidden outer belt weatherstrip is generally used.

SUMMARY

According to some aspects of the present disclosure, a hidden belt weatherstrip assembly is provided on a vehicle door sheet metal with a first positioning member. The hidden belt weatherstrip assembly includes an outer belt weatherstrip. A first injection-molded joint corner is provided on an end side of the outer belt weatherstrip. A first positioning portion is provided on the first injection-molded joint corner. The first positioning member is fitted to the first positioning portion. The first injection-molded joint corner is fixed to the vehicle door sheet metal.

In some embodiments, the hidden belt weatherstrip assembly includes an inner belt weatherstrip located below the outer belt weatherstrip.

In some embodiments, a second injection-molded joint corner is provided on an end side of the inner belt weatherstrip, the second injection-molded joint corner is fixed to the vehicle door sheet metal, and the second injection-molded joint corner is provided corresponding to the first injection-molded joint corner.

In some embodiments, the first positioning portion is a slot.

In some embodiments, the slot has an accommodating area and an opening in communication with the accommodating area, and the first positioning member is clamped into the accommodating area through the opening.

In some embodiments, the slot further has guiding edges extending inclined outwards and downwards from the opening to both sides.

In some embodiments, a depth of the slot is less than a thickness of a corresponding position of the outer belt weatherstrip.

In some embodiments, the first positioning member comprises a positioning column, and the positioning column is provided to protrude towards the outer belt weatherstrip along a sheet metal surface of the vehicle door sheet metal.

In some embodiments, a limiting block is provided at an end of the positioning column, and the limiting block is configured to be clamped into the first positioning portion.

In some embodiments, the positioning column is in a welded connection with the vehicle door sheet metal.

In some embodiments, the first positioning member is joint with the first injection-molded joint corner in a length direction of a vehicle body.

In some embodiments, the first positioning member is joint with the first injection-molded joint corner in the length direction of the vehicle body by a lap amount of 2.0 mm to 3.0 mm.

In some embodiments, the first positioning member is closely connected with the first injection-molded joint corner.

In some embodiments, the first injection-molded joint corner and the first positioning portion are integrally formed by injection molding.

In some embodiments, the slot is an open structure with a notch downwards.

According to some aspects of the present disclosure, a vehicle includes a vehicle door sheet metal with a first positioning member, and a hidden belt weatherstrip assembly. The hidden belt weatherstrip assembly includes an outer belt weatherstrip. A first injection-molded joint corner is provided on an end side of the outer belt weatherstrip, and a first positioning portion is provided on the first injection-molded joint corner. The first positioning member is fitted to the first positioning portion, and the first injection-molded joint corner is fixed to the vehicle door sheet metal.

In some embodiments, the hidden belt weatherstrip assembly further comprises an inner belt weatherstrip located below the outer belt weatherstrip.

In some embodiments, the first positioning portion is a slot.

In some embodiments, the first positioning member comprises a positioning column, and the positioning column is provided to protrude towards the outer belt weatherstrip along a sheet metal surface of the vehicle door sheet metal.

In some embodiments, the first positioning member is joint with the first injection-molded joint corner in a length direction of a vehicle body.

BRIEF DESCRIPTION OF DRAWINGS

In order to illustrate the technical solutions and advantages in the embodiments of the present disclosure more clearly, the accompanying drawings used in the description of the embodiments will be briefly described hereunder. Apparently, the drawings in the following description are intended for some embodiments of present disclosure. For persons of ordinary skill in the art, other drawings may be obtained based on these drawings without any creative effort.

Figure 1:
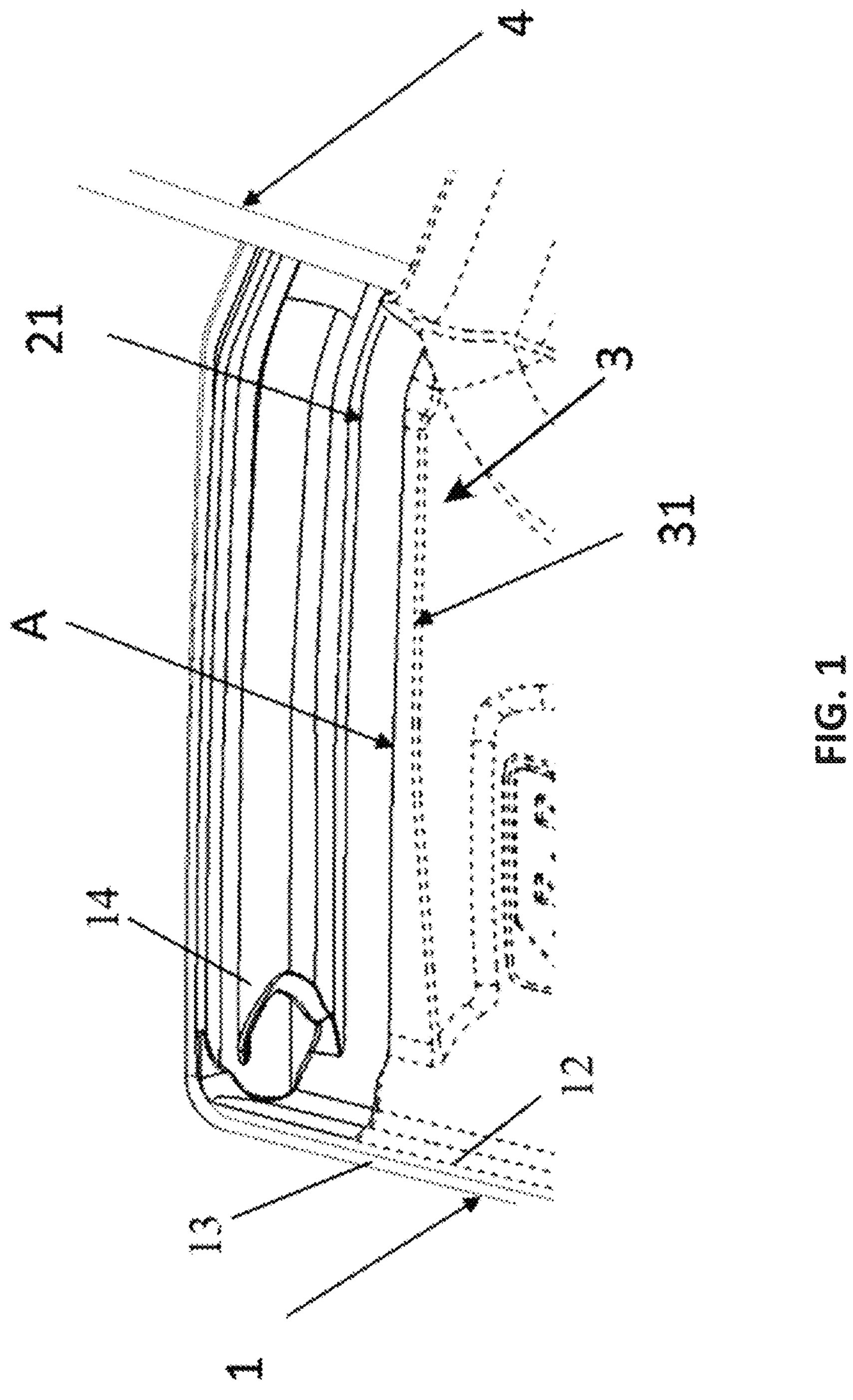
FIG. 1 is a schematic diagram of a fitting relationship between an outer belt weatherstrip and a vehicle door sheet metal provided in an embodiment of the present disclosure.

In the figures: 1—Vehicle door sheet metal; 2—Outer belt weatherstrip; 3—Inner belt weatherstrip; 4—Vehicle window glass; 11—First positioning member; Positioning column—111; Limiting block—112; 12—Vehicle door inner plate; 13—Vehicle door outer plate; 14—Lip edge; 21—First injection-molded joint corner; 31—Second injection-molded joint corner; 211—First positioning portion; 211*a*—Accommodating area; 211*b*—Opening; 211*c*—Guiding edge; A—Demarcation point between inner and outer belt weatherstrips; B—Contact point fitting in Z-direction.

DETAILED DESCRIPTION

The technical solutions in the embodiments of the present disclosure will be clearly and comprehensively described hereunder in conjunction with the accompanying drawings in the embodiments of the present disclosure. Apparently, the described embodiments are merely a part of the embodiments of the present disclosure, rather than all embodiments of the present disclosure. All other embodiments obtained by those of ordinary skill in the art based on the embodiments of the present disclosure without any creative effort shall fall within the scope of protection of the present disclosure.

It should be noted that the terms such as "first," "second," and the like in the specification and the claims as well as the foregoing accompany drawings of the present disclosure are used to distinguish similar objects, but not intended to describe a specific order or sequence. It should be appreciated that the data used in this way is interchangeable under appropriate circumstances, such that the embodiments of the present disclosure as described herein can be implemented in an order other than those illustrated or described herein. Moreover, the terms such as "include" and "have" and any variations thereof are intended to cover a non-exclusive inclusion, e.g., processes, methods, apparatuses, products, or devices that encompass a series of steps or units are not necessarily limited to those steps or units that are explicitly listed, but may include other steps or units that are not explicitly listed or inherent to these processes, methods, products or devices.

The embodiments are described hereunder with reference to the accompanying drawings, and in no way would the accompanying drawings limit the disclosure contents recited in the claims.

Currently, for a hidden outer belt weatherstrip applied in automobiles on the market, no injection-molded joint corner structure is provided at an end of the outer belt weatherstrip, and a demarcation point between the outer belt weatherstrip and an inner belt weatherstrip is located at a rear end of the glass. During assembling, the outer belt weatherstrip being fixed to a vehicle door sheet metal is achieved by designing the inner belt weatherstrip with an injection-molded joint corner and using a double-sided film for bonding. However, the hidden outer belt weatherstrip has no fixing and fitting style formed at its two ends with the vehicle door sheet metal, hence failing to fully cover the ends of the vehicle door sheet metal. Therefore, it is desirable to provide a hidden belt weatherstrip assembly to solve the above-mentioned problem.

In order to address the problem as described above and other problems, the present disclosure provides a hidden belt weatherstrip assembly adopting the following technical solutions. A hidden belt weatherstrip assembly is provided on a vehicle door sheet metal provided with a first positioning member, and includes an outer belt weatherstrip. A first injection-molded joint corner is provided on an end side of the outer belt weatherstrip, and a first positioning portion is provided on the first injection-molded joint corner.

The hidden belt weatherstrip assembly provided in the present disclosure has the following beneficial effects. First, according to the present disclosure, the first injection-molded joint corner is provided on an end side of the hidden outer belt weatherstrip, and the positioning portion is provided on the injection-molded joint corner to cooperate with the positioning member added on the vehicle door sheet metal, so that a positioning reference is provided for assembly of the hidden outer belt weatherstrip, and meanwhile, an edge wrapping area of the vehicle door sheet metal can be reasonably covered, thereby improving the appearance quality after the vehicle door is opened. Second, in the present disclosure, the fixing methods of the hidden outer belt weatherstrip and the vehicle door sheet metal can achieve the limiting of the hidden outer belt weatherstrip in length and height directions of a vehicle body. Therefore, the difficulty of installation operation is reduced, and the installation efficiency is improved.

Figure 2:
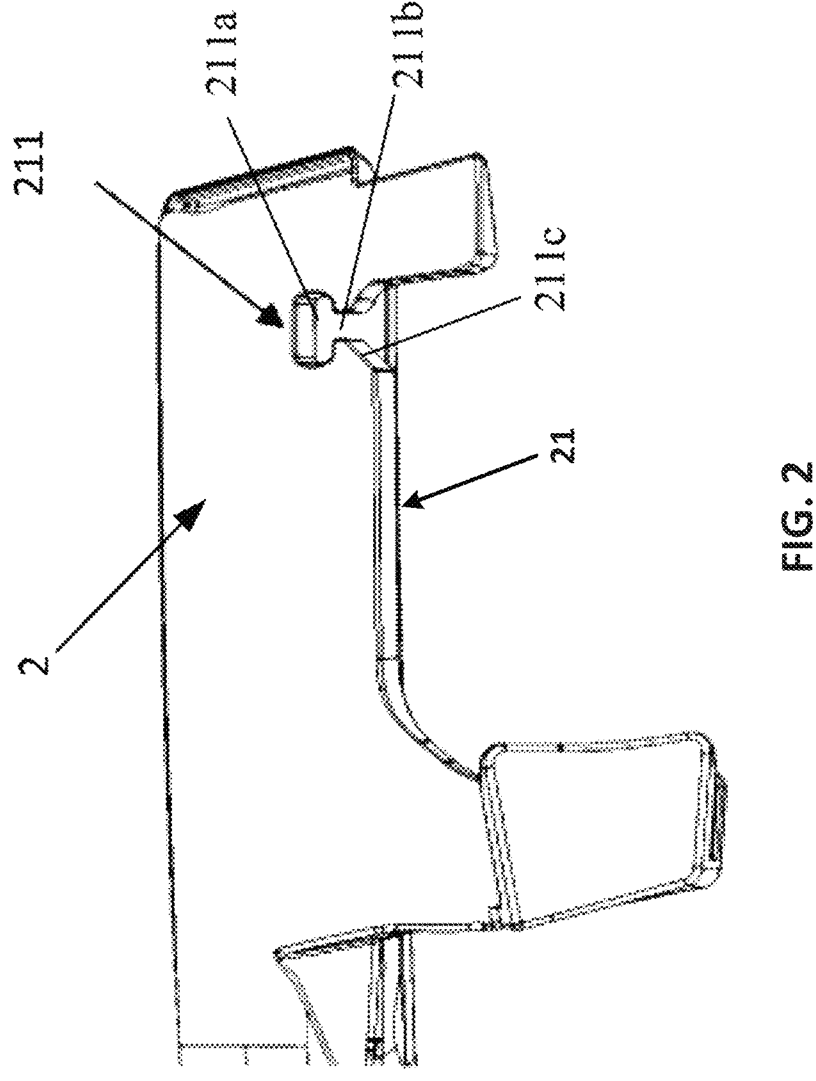
FIG. 2 is a structure diagram of a joint corner of a hidden outer belt weatherstrip provided in an embodiment of the present disclosure.
Figure 3:
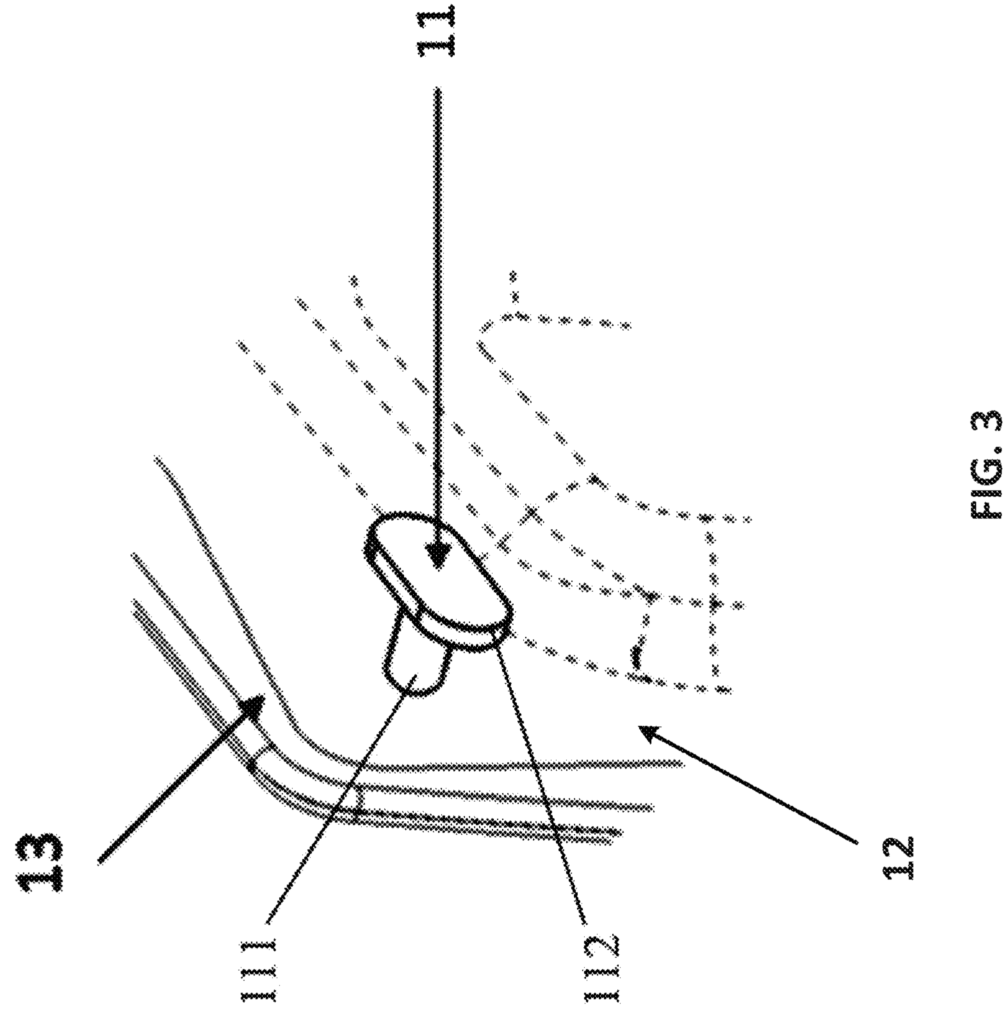
FIG. 3 is a structural diagram of a stud being welded to a vehicle door sheet metal provided in an embodiment of the present disclosure.
Figure 4:
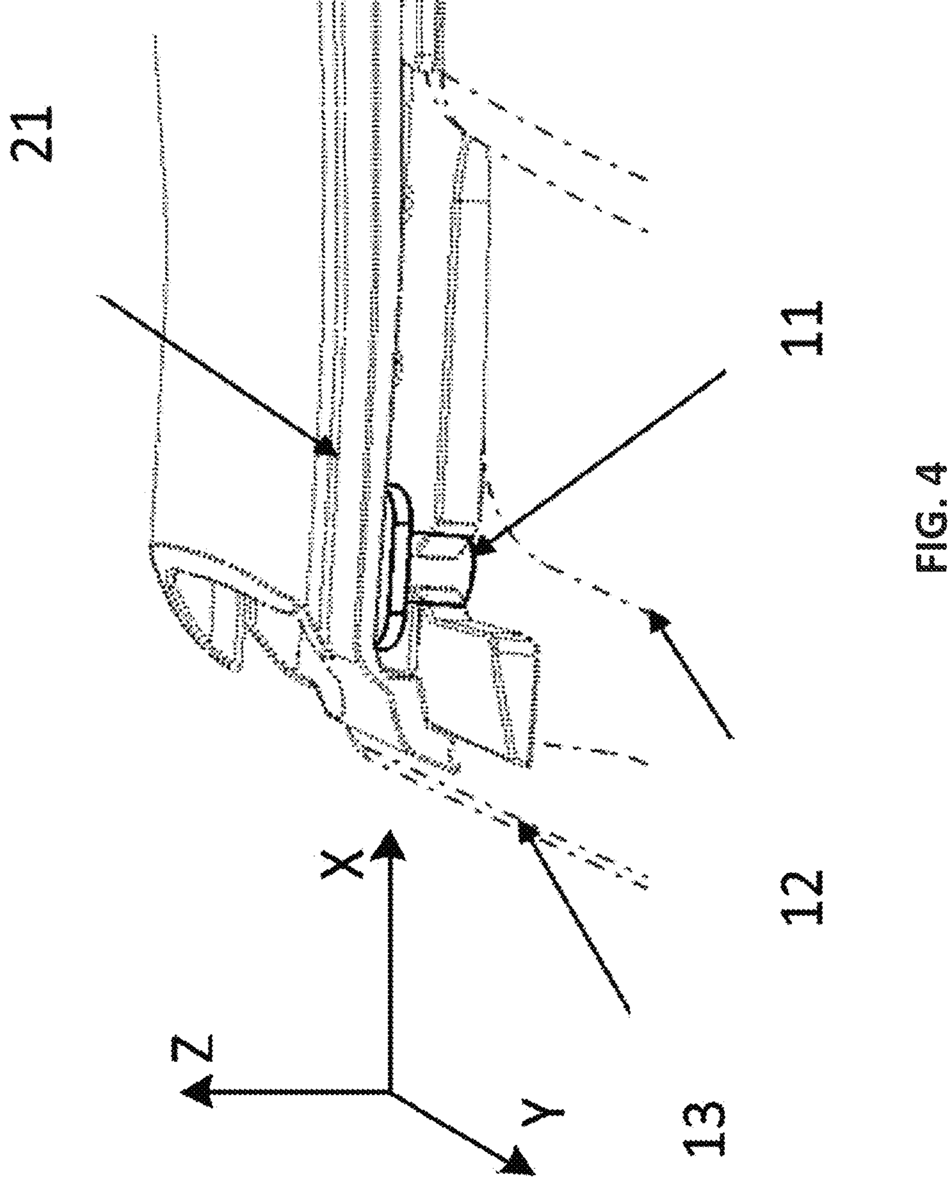
FIG. 4 is a structural diagram of an injection-molded joint corner of a hidden outer belt weatherstrip being limited to a vehicle door outer plate in a Y-direction provided in an embodiment of the present disclosure.
Figure 5:
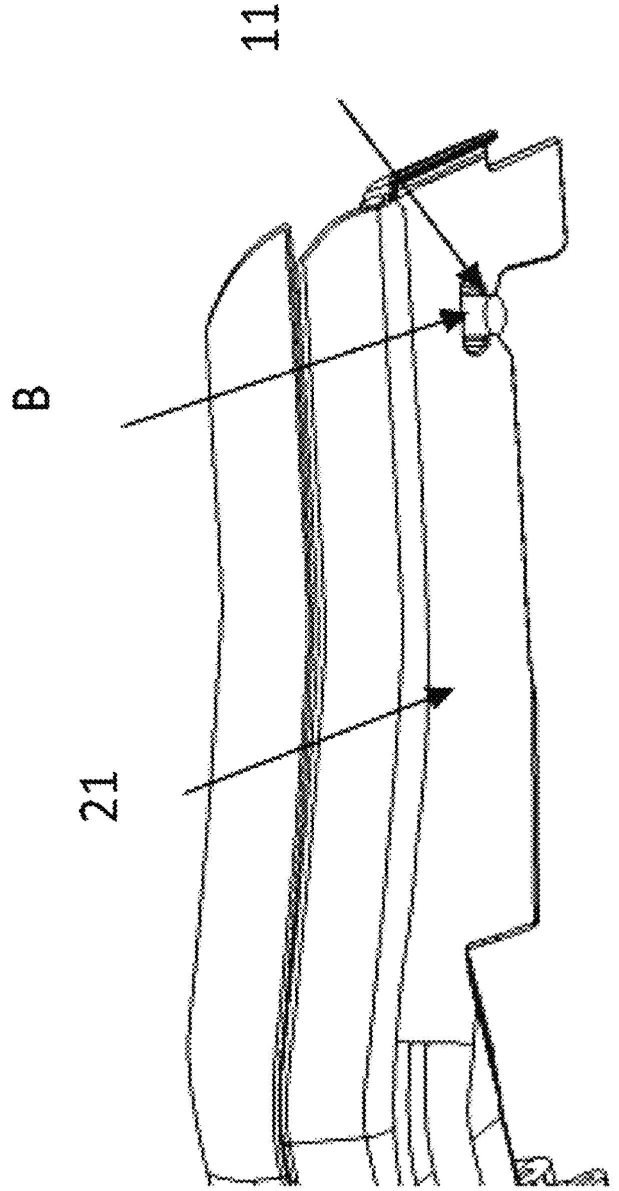
FIG. 5 is a structure diagram of an injection-molded joint corner of a hidden outer belt weatherstrip being limited to a vehicle door outer plate in a Z-direction provided in an embodiment of the present disclosure.

With reference to FIG. 1 to FIG. 5, an embodiment of the present disclosure provides a hidden belt weatherstrip assembly, which is provided on a vehicle door sheet metal 1 provided with a first positioning member 11 and includes an outer belt weatherstrip 2. A first injection-molded joint corner 21 is provided on an end side of the outer belt weatherstrip 2, and a first positioning portion 211 is provided on the first injection-molded joint corner 21. The first injection-molded joint corner 21 is fixed to the vehicle door sheet metal 1, and the first positioning member 11 is fitted to the first positioning portion 211.

In this way, the present disclosure takes advantage of a fitted connection between the first positioning portion 211 provided at the outer belt weatherstrip 2 and the first positioning member 11 of the vehicle door sheet metal 1, so that it is convenient to install and position the outer belt weatherstrip 2, and further an edge wrapping area of the vehicle door sheet metal 1 is reasonably covered on the basis of providing the first injection-molded joint corner 21 to the outer belt weatherstrip 2, thereby avoiding a problem of poor appearance caused by edge wrapping of the sheet metal in an irregular area after the vehicle door is opened.

In some embodiments, the hidden belt weatherstrip assembly further includes an inner belt weatherstrip 3. The inner belt weatherstrip 3 is provided corresponding to the outer belt weatherstrip 2.

For example, the vehicle door sheet metal 1 is divided into a vehicle door inner plate 12 and a vehicle door outer plate 13, and both the inner belt weatherstrip 3 and the outer belt weatherstrip 2 are fixed to the vehicle door inner plate 12. For example, both the inner belt weatherstrip 3 and the outer belt weatherstrip 2 can be clamped to the vehicle door inner plate 12. The inner belt weatherstrip 3 is located below the outer belt weatherstrip 2 (see a mark A in FIG. 1 for a demarcation line between the inner and outer belt weatherstrips), and the inner belt weatherstrip 3 and the outer belt weatherstrip 2 are provided with a lip edge 14 contactable with a vehicle window glass 4, so that water droplets, steams, and dusts on the glass surface are cut off when the vehicle window glass 4 is regulated, thereby improving sealing performance between the hidden belt weatherstrip assembly and the vehicle window glass 4. When in use, the rainwater can be effectively prevented from passing through the hidden belt weatherstrip assembly to reach the inside of the vehicle door outer plate 13, playing an aesthetic role meanwhile.

In some embodiments, a second injection-molded joint corner 31 is provided on an end side of the inner belt weatherstrip 3. The second injection-molded joint corner 31 is fixed to the vehicle door sheet metal 1, and the second injection-molded joint corner 31 is provided corresponding to the first injection-molded joint corner 21. By providing the second injection-molded joint corner 31 on the end side of the inner belt weatherstrip 3, an edge wrapping area of the vehicle door sheet metal 1 can be reasonably covered by the inner belt weatherstrip 3. In the present embodiment, by correspondingly providing the second injection-molded joint corner 31 and the first injection-molded joint corner 21, the edge wrapping area of the vehicle door sheet metal 1 can be covered in full jointly by the inner belt weatherstrip 3 and the outer belt weatherstrip 2.

In some embodiments, the first positioning portion 211 is a slot provided on an inner side of the outer belt weatherstrip 2. The slot is an open structure with a notch downwards, and a depth of the slot is less than a thickness of a corresponding position of the outer belt weatherstrip 2. That is, the slot does not run through the outer belt weatherstrip 2 in a thickness direction of the outer belt weatherstrip 2.

For example, the slot has an accommodating area 211*a* and an opening 211*b* in communication with the accommodating area 211*a*. The opening 211*b* of the slot is dimensionally matched with the first positioning member 11. The opening 211*b* of the slot is also provided with guiding edges 211*c* extending inclined outwards and downwards from the opening 211*b* to both sides, and two guiding edges 211*c* together form a flared-shaped structure. During assembly, the opening 211*b* of the slot is oriented towards the first positioning member 11, and the first positioning member 11 smoothly enters the slot through the guiding edges 211*c*, facilitating the assembly of the outer belt weatherstrip 2 and the vehicle door sheet metal 1.

In some embodiments, the first positioning member 11 includes a positioning column 111, and the positioning column 111 is provided to protrude towards the outer belt weatherstrip 2 along a sheet metal surface of the vehicle door sheet metal 1. In the present embodiment, the positioning column 111 protrudes and extends inwardly along the vehicle door inner plate 12.

Further, a limiting block 112 is provided at an end of the positioning column 111, and the limiting block 112 is clamped into the accommodating area 211*a* after the positioning column 111 passes through the opening 211*b* of the slot, so that the outer belt weatherstrip 2 is fixed to the vehicle door inner plate 12. The first positioning member 11 includes but is not limited to fasteners, such as a bolt and a screw. In an embodiment, the first positioning member 11 is a bolt.

For example, in the present embodiment, the limiting block is added to the positioning column, so that the accommodating area 211*a* on the outer belt weatherstrip 2 is clamped to the limiting block 112 of the vehicle door sheet metal 1, thereby limiting the outer belt weatherstrip 2, and improving installation stability of the outer belt weatherstrip 2.

In some embodiments, the positioning column is in a welded connection with the vehicle door sheet metal 1.

In the present embodiment, the positioning column is fixed to the vehicle door sheet metal 1 by means of welding. Thus, an installation reference is provided for the outer belt weatherstrip 2, and the accommodating area 211*a* on the outer belt weatherstrip 2 is clamped to the limiting block 112 of the vehicle door sheet metal 1 during installation. In addition, the outer surface of the outer belt weatherstrip 2 abuts against the inner surface of the vehicle door sheet metal 1, thereby achieving the limiting of the outer belt weatherstrip 2 in the Y-direction of the vehicle body and improving the service life of the parts.

In some embodiments, the positioning column can also be fixed to the vehicle door sheet metal 1 by means of bonding, clamping, or threaded connection.

In some embodiments, the first positioning member 11 is joint with the first injection-molded joint corner 21 on the outer belt weatherstrip 2 in a length direction of a vehicle body by a lap amount of 2.0 mm to 3.0 mm. That is, the positioning column 111 has a diameter of 2.0 mm to 3.0 mm.

For example, through the slot, the first injection-molded joint corner 21 on the outer belt weatherstrip 2 in the present embodiment is clamped with a stud welded on the vehicle door sheet metal 1, and the welded stud is unilaterally joint with the first injection-molded joint corner 21 on the outer belt weatherstrip 2 by a lap amount of 2.5 mm in the X-direction, playing a role of X-direction limiting.

In some embodiments, the first positioning member 11 is closely fitted to the first injection-molded joint corner 21 on the outer belt weatherstrip 2.

For example, through the slot, the first injection-molded joint corner 21 on the outer belt weatherstrip 2 is clamped with the stud welded on the vehicle door sheet metal 1. The welded stud and the first injection-molded joint corner 21 on the outer belt weatherstrip 2 have a contact clearance of zero in the Z-direction (see a mark B in FIG. 5 for a contact point fitting in the Z-direction), hence playing a role of Z-direction positioning for the outer belt weatherstrip during assembly.

In some embodiments, the first injection-molded joint corner 21 and the first positioning portion 211 are integrally formed by injection molding.

For example, the integral injection molding can ensure the stability of the structure of the first injection-molded joint corner 21, so that it is convenient for mass production.

In some embodiments, a second positioning portion is provided on the second injection-molded joint corner 31, a second positioning member is provided on the vehicle door sheet metal 1, and the second positioning member is fitted to the second positioning portion.

In the present embodiment, in order to facilitate the positioning and installation of the inner belt weatherstrip 3, the second positioning portion member is provided as a slot in terms of its structure, and the second positioning portion is provided as a positioning column in terms of its structure. A specific arrangement relationship therebetween is the same as the arrangement relationship in the outer belt weatherstrip. Hence, the details will not be described here again.

In some embodiments, the present disclosure in another aspect provides a vehicle door, including the vehicle door sheet metal 1 and the hidden belt weatherstrip assembly as described above.

For the hidden belt weatherstrip assembly disclosed herein, an injection-molded joint corner structure is provided on the outer belt weatherstrip, and cooperates with the injection-molded joint corner for the inner belt weatherstrip, to reasonably cover the edge wrapping area of the vehicle door sheet metal, thereby avoiding the problem of poor appearance caused by sheet metal edge wrapping in an irregular area after the vehicle door is opened. The slot is opened on the injection-molded joint corner structure of the outer belt weatherstrip, and cooperates with the positioning column welded on the vehicle door sheet metal, thereby solving the problems that it is impossible to provide installation and positioning references on the vehicle door sheet metal for the hidden outer belt weatherstrip and the Y-direction limiting is impossible due to the limited space of the vehicle door modelling, and meanwhile improving the durability of the parts. Also, a positioning surface will also be provided for the concealed belt line molding, which solves the problem that the Z-direction positioning is impossible for the hidden outer belt weatherstrip during assembly.

The embodiments in the specification are described progressively, and cross reference can be made to the embodiments for the same and similar parts therebetween, where each embodiment focuses on differences from other embodiments.

It should be noted that all the features recorded in the present disclosure (including the technical features recorded in different embodiments) can be arbitrarily combined under reasonable circumstances, and all the new technical solutions formed by the combination are within the scope of protection of the present disclosure.

The above descriptions are merely embodiments of the present disclosure, and shall not be considered as a limitation to the present disclosure. Any modifications, equivalent replacements, and improvements within the spirit and the principle of the present disclosure shall be included in the scope of protection of the present disclosure.

What is claimed is:

1. A hidden belt weatherstrip assembly, provided on a vehicle door sheet metal connected with a first positioning member, comprising:

an outer belt weatherstrip, wherein:

a first injection-molded joint corner is provided on an end side of the outer belt weatherstrip, and a first positioning portion is provided on the first injection-molded joint corner; and the first positioning portion comprises an open structure being downwardly open and extending from the end side of the outer belt weatherstrip, the open structure having an opening profile with varying widths to limit movement of the first positioning member, wherein:

the first positioning member is inserted from the end side of the outer belt weatherstrip and fitted into the open structure of the first positioning portion along a vertical direction perpendicular to a length direction of a vehicle body;

the first positioning member comprises a positioning column attached to and protruding from the vehicle door sheet metal and a limiting block arranged at an end of the positioning column, the positioning column extending into the open structure of the first positioning portion, and the limiting block being inserted into the open structure and retained by the opening profile having varying widths to constrain the outer belt weatherstrip relative to the vehicle door sheet metal; and the first injection-molded joint corner is fixed to the vehicle door sheet metal.

2. The hidden belt weatherstrip assembly according to claim 1, further comprising:

an inner belt weatherstrip located below the outer belt weatherstrip.

3. The hidden belt weatherstrip assembly according to claim 2, wherein a second injection-molded joint corner is provided on an end side of the inner belt weatherstrip, the second injection-molded joint corner is fixed to the vehicle door sheet metal, and the second injection-molded joint corner is provided corresponding to the first injection-molded joint corner.

4. The hidden belt weatherstrip assembly according to claim 1, wherein the open structure of the first positioning portion is a slot.

5. The hidden belt weatherstrip assembly according to claim 4, wherein the slot has an accommodating area and an opening in communication with the accommodating area, and the limiting block of the first positioning member is clamped into the accommodating area through the opening along the vertical direction.

6. The hidden belt weatherstrip assembly according to claim 5, wherein the slot further has guiding edges inclined outwards and downwards from the opening to both sides of the slot.

7. The hidden belt weatherstrip assembly according to claim 4, wherein a depth of the slot is less than a thickness of a corresponding position of the outer belt weatherstrip.

8. The hidden belt weatherstrip assembly according to claim 4, wherein the first injection-molded joint corner and the first positioning portion are integrally formed by injection molding.

9. The hidden belt weatherstrip assembly according to claim 1, wherein the positioning column is configured to protrude towards the outer belt weatherstrip along a sheet metal surface of the vehicle door sheet metal.

10. The hidden belt weatherstrip assembly according to claim 9, wherein the limiting block is configured to be clamped into the first positioning portion.

11. The hidden belt weatherstrip assembly according to claim 9, wherein the positioning column is in a welded connection with the vehicle door sheet metal.

12. The hidden belt weatherstrip assembly according to claim 1, wherein the first positioning member is connected with the first injection-molded joint corner in the length direction of the vehicle body.

13. The hidden belt weatherstrip assembly according to claim 12, wherein the first positioning member is connected with the first injection-molded joint corner in the length direction of the vehicle body by a lap amount of 2.0 mm to 3.0 mm.

14. The hidden belt weatherstrip assembly according to claim 1, wherein the first positioning member is connected with the first injection-molded joint corner.

15. The hidden belt weatherstrip assembly according to claim 1, wherein the open structure of the first positioning portion comprises a notch downwards.

16. A vehicle door, comprising:

a vehicle door sheet metal connected with a first positioning member; and a hidden belt weatherstrip assembly, comprising:

an outer belt weatherstrip, wherein:

a first injection-molded joint corner is provided on an end side of the outer belt weatherstrip, and a first positioning portion is provided on the first injection-molded joint corner; and the first positioning portion comprises an open structure being downwardly open and extending from the end side of the outer belt weatherstrip, the open structure having an opening profile with varying widths to limit movement of the first positioning member, wherein:

the first positioning member is inserted from the end side of the outer belt weatherstrip and fitted into the open structure of the first positioning portion along a vertical direction perpendicular to a length direction of a vehicle body;

the first positioning member comprises a positioning column attached to and protruding from the vehicle door sheet metal and a limiting block arranged at an end of the positioning column, the positioning column extending into the open structure of the first positioning portion, and the limiting block being inserted into the open structure and retained by the opening profile having varying widths to constrain the outer belt weatherstrip relative to the vehicle door sheet metal; and the first injection-molded joint corner is fixed to the vehicle door sheet metal.

17. The vehicle door according to claim 16, wherein the hidden belt weatherstrip assembly further comprises an inner belt weatherstrip located below the outer belt weatherstrip.

18. The vehicle door according to claim 16, wherein the open structure of the first positioning portion is a slot.

19. The vehicle door according to claim 16, wherein the positioning column is configured to protrude towards the outer belt weatherstrip along a sheet metal surface of the vehicle door sheet metal.

20. The vehicle door according to claim 16, wherein the first positioning member is connected with the first injection-molded joint corner in the length direction of the vehicle body.

* * * * *